Oct. 12, 1954  J. T. CLARKE  2,691,625
RECOVERY OF BENZENE HEXACHLORIDE BY STEAM DISTILLATION
Filed March 29, 1952

INVENTOR.
JOHN T. CLARKE
BY Kenneth Swartwood
ATTORNEY

Patented Oct. 12, 1954

2,691,625

UNITED STATES PATENT OFFICE 2,691,625

RECOVERY OF BENZENE HEXACHLORIDE BY STEAM DISTILLATION

John T. Clarke, Baton Rouge, La., assignor to Ethyl Corporation, New York, N. Y., a corporation of Delaware Application March 29, 1952, Serial No. 279,302

1 Claim. (Cl. 202—46)

This invention relates to the recovery of benzene hexachloride, and more particularly to the recovery of benzene hexachloride in a fine, free-flowing form directly from a benzene hexachloride-benzene solution.

In the manufacture of benzene hexachloride, chlorine is reacted with an excess of benzene in the presence of actinic light and the benzene hexachloride product is obtained as a reactor solution containing between about 15–50 percent by weight thereof in benzene solution. Generally, a 20 weight percent benzene hexachloride solution is obtained. The benzene hexachloride must normally be recovered from the benzene solvent. At present, this recovery is accomplished laboriously and uneconomically by a series of process steps. First, the excess chlorine must be removed from the reactor solution, usually by a chemical treatment such as an alkaline wash. Second, the benzene solvent is removed by distillation at high temperature to produce a molten residue of benzene hexachloride. This molten residue is then solidified by some such means as drum-casting, and finally submitted to a grinding or flaking operation. While producing a desirable free-flowing, flaky product, the several process operations are costly from both a process equipment and operational standpoint.

An even more serious disadvantage of such prior recovery processes resides in the several stages in the process during which decomposition and contamination of the benzene hexachloride product can occur. A particularly critical phase is during the high temperature distillation or flashing of the solvent benzene, necessitating close control by elaborate means of both the ultimate temperature and the residence period of the benzene hexachloride. Furthermore, removal of all chlorine prior to this step is essential to avoid excessive decomposition or contamination of the benzene hexachloride even when such close control is obtained.

Conventional steam distillation of the benzene from the reactor solution has been previously considered (U. S. Patent No. 2,553,956). Employing steam distillation, a mixture of water and benzene containing benzene hexachloride might be expected to boil between about 68–70° C. In the volumes of solvent encountered in benzene hexachloride manufacture, however, equilibrium conditions cannot normally be obtained and the operating temperature is normally closer to the boiling point of water. In fact, the benzene hexachloride-benzene phase tends to be heated to even higher temperatures, especially when the vessel is externally heated or relatively high temperature steam is employed.

Benzene hexachloride becomes molten or semi-molten at temperatures approaching 100° C., especially after long residence periods at such temperatures. Under these conditions and in the presence of dehydrohalogenation catalysts, such as the iron normally present in the crude product, decomposition of the benzene hexachloride occurs. Also, upon cooling, the benzene hexachloride product is extremely dense and sets up as a hard cake. For subsequent insecticidal use or for use in the manufacture of lindane, it is normally necessary to grind, pulverize, or otherwise finely divide the product or to remelt and drum-cast.

While lower temperatures may be approached with sufficient agitation of the system during steam distillation, such agitation at temperatures above about 80° C. effects agglomeration, compaction and caking of the benzene hexachloride to give a product somewhat similar to higher temperature operation.

It is accordingly an object of the present invention to provide a simple and economical method and apparatus for recovering flaky benzene hexachloride from benzene solution thereof.

Another object is to provide a method and apparatus of the above type to recover benzene hexachloride from benzene reactor solutions which eliminates a separate chlorine scrubbing operation, which permits recovery of the unreacted chlorine gas from the reactor solutions, which eliminates drum-casting of the benzene hexachloride following removal of the benzene solvent, and which eliminates decomposition of the benzene hexachloride product.

Other objects of this invention will appear in the following description and appending claims, reference being had to the accompanying drawings forming a part of this specification wherein like reference characters designate corresponding parts in the several views.

Before explaining the present invention in detail, it is to be understood that the invention is not limited in its application to the details of the process or of the construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

It has been found that if a benzene hexachloride-benzene solution is first atomized, aspirated, or otherwise highly dispersed and passed into a stream of steam and the two streams intimately mix, the benzene is readily vaporized from the benzene hexachloride particles and the benzene-free particles will setlte from the vapor and may be recovered in a water slurry. The benzene hexachloride particles under such conditions retain their high state of subdivision and are easily recovered in a readily usable form. In addition, the benzene may be removed from the system with quantities of steam and, after condensation, and separation, may be recycled if desired to the benzene chlorinator.

The highly dispersed solution particles or droplets, such as is effected by atomization or aspiration are substantially completely dispersed with the steam. In addition, the benzene in such condition has a very large surface area per unit volume in direct contact with the steam vapor. Thus, the vaporization rate of the benzene is greatly increased and the vaporization is considerably more complete than was previously possible with prior methods. For example, when boiling a mixture of water and benzene, containing benzene hexachloride, the excess benzene is removed fairly rapidly. However, to remove the final 5 to 10 weight percent of the benzene, the mixture must be boiled over relatively long periods and at a temperature corresponding generally to the boiling point of water. These conditions, as noted above, result in the formation of a molten or semi-molten benzene hexachloride, which upon cooling, sets up as a dense relatively hard cake. Also, decomposition is frequently encountered under these conditions. In contrast, when vaporizing the benzene in an atomized or other highly dispersed state, in accordance with the present invention, essentially complete removal of the benezene is accomplished in relatively short periods of time and the benzene hexachloride is recovered in a high state of subdivision.

If desired, the vaporization may be carried out under a partial vacuum so as to reduce the vaporization temperature.

Figure 1:
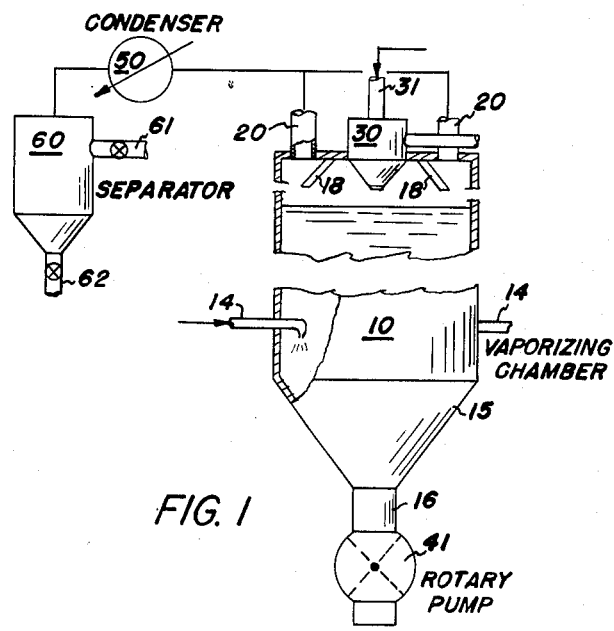
Figure 1 is an elevational view, partly in section, of an apparatus embodying the features of the present invention.
Figures 2, 3:
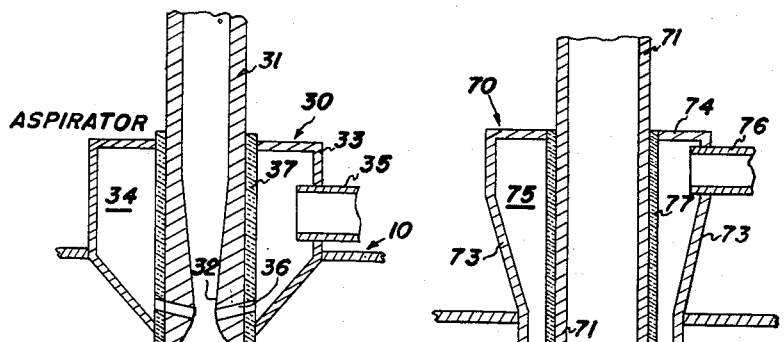
Figure 2 is an enlarged sectional view showing the details of the aspirator illustrated in Figure 1.
Figure 3 is a similar view showing a modification or equivalent of the aspirator shown in Figures 1 and 2.

The present process may be conducted in a wide variety of apparatus. A preferred form of apparatus is shown in the drawings. With particular reference to Figures 1 and 2, a vaporizing chamber 10 is illustrated which is provided at its top with an aspirator mixer 30 for atomizing the benzene hexachloride solution and intimately mixing the same with steam. At the bottom of the vaporizing chamber 10 there is a rotary pump 40 for continuously removing the water-benzene hexachloride slurry therefrom to any suitable recovery system (not shown). The benzene-steam phase is continuously removed from the chamber 10 through a condenser 50 and the condensed immiscible phases are separated in the liquid phase separator 60.

The vaporizing chamber 10 is a cylindrical vessel having sufficient height to permit a substantial temperature gradient between the upper vaporizing zone, and the cone-shaped exit end 15 thereof. Thus, while the vaporizing zone is maintained essentially at the boiling point of the benzene-water mixture, the benzene hexachloride-water slurry may be maintained at a relatively low temperature while passing through the pump 40, so as to obviate any tendency of the highly dispersed benzene hexachloride to cake or pack. A plurality of water jets 14 is provided adjacent the bottom of the vaporizing chamber to additionally cool the slurry and to prevent any collection of the benzene hexachloride in the throat 16 of the lower outlet of the chamber 10. External cooling may also be employed, if desired.

The vaporizing chamber 10 is also provided with baffle plates 18 adjacent to the vapor outlet lines 20 to facilitate settling of the fine benzene hexachloride particles. The latter is also aided by making the plurality of outlet lines 20 large relative to the aspirator outlet so as to reduce the flow velocities of the vapors and thus minimize solids entrainment by the vapors. The vapor outlet area should be at least ten (10) times greater than the area of the venturi or steam inlet.

The aspirator 30 comprises a steam inlet 31 having a venturi restriction 32 adjacent to the lower outlet end thereof; an annular housing 33 forming an annular chamber 34 surrounding the steam inlet 31; and a benzene hexachloride-benzene inlet pipe 25 passing through a wall of the housing 33 and communicating with the annular chamber 34. The latter chamber is also connected through a plurality of ports 36 with the steam inlet 31, slightly down-stream from the maximum restriction of the venturi 32. A heat insulating sleeve 37 is provided between the steam inlet 31 and the annular chamber 34 to prevent over-heating of the benzene hexachloride solution prior to vaporization thereof by the aspirator 30.

The rotary pump 40 is of simple paddle wheel construction. While other types of pumps or conveyors may be suitable for removing the benzene hexachloride-water slurry from the vaporization chamber, a rotary pump of this type is preferred so as to eliminate any possibility of packing or caking of the fine benzene hexachloride particles when relatively little cooling is provided in the lower section of the vaporization chamber 10. The operation of the pump 40 is preferably controlled to maintain constant head of slurry in the vaporizing chamber 10.

The fine benzene hexachloride may be recovered from the water by any well known means. For example, the excess water may be simply decanted, and the benzene hexachloride dried at moderate temperatures, such as by contact with a current of air.

The condenser 50, shown schematically, may be of any conventional type, such as a coil or tube type condenser. The phase separator 60, as shown, is preferably a drum providing a valved upper liquid outlet 61 for removing the benzene and a valved lower liquid outlet 62 for removing the water phase. The benzene is preferably recycled to a chlorinator (not shown) for conversion to additional benzene hexachloride. The condensed water phase, removed through outlet 62, normally contains unreacted chlorine which may be boiled off or otherwise recovered as chlorine gas and also recycled to the chlorinator.

A modification of the aspirator is illustrated in Figure 3. This aspirator 70 comprises concentric tubes 71 and 72. The latter is flared at 73 and flanged at 74 to form an annular chamber 75 surrounding the inner tube 71. In this modification, the steam preferably enters the vaporizing chamber through the inner tube 71 and the benzene hexachloride solution enters through the pipe 72 from an inlet pipe 76 and the annular chamber 75. However, if desired, this may be reversed, i. e. the steam may enter from the annular chamber and the benzene hexachloride solution pass through the inner tube 71. A heat insulating sleeve 77 is also provided between the inner tube and the annular chamber 75 to prevent overheating of the benzene hexachloride solution, prior to vaporization or atomization by the steam.

The benzene hexachloride solution may be dispersed by any of a large number of conventional means. In addition to the use of Venturi or concentric tubes, the solution may be passed through a jet, a spray nozzle, a rotating perforated disc, or any similar device which will shear or disperse the liquid into small droplets or liquid particles.

Example I

A 20 percent by weight solution of benzene hexachloride in benzene was passed through a 5 millimeter tube at a rate of about 30 grams per minute into a vaporization vessel. Concurrently, a stream of steam, at approximately 5 p. s. i. gage pressure, was passed into the benzene stream through a 10 millimeter tube, positioned concentric with the 5 millimeter tube. The benzene solution was vaporized or atomized by the steam and intimately mixed therewith. The gaseous mixture of steam and benzene was continuously removed from the system, and finely-divided, flaky benzene hexachloride particles settled to the bottom of the vaporization vessel with condensed water. The benzene hexachloride-water slurry was removed from the vessel, air dried and the resulting product was light and flaky.

Example II

When the above experiment is repeated employing an aspirator having a venturi restriction into which the benzene hexachloride-benzene solution is drawn into the stream of steam, the benzene solution is atomized to a very high degree and the benzene is quickly and completely mixed with the steam. Very rapid and thorough vaporization of the benzene solvent from the benzene hexachloride particles is attained, leaving the particles essentially benzene-free. With this procedure, the particles are very fine and, upon drying, are free-flowing and do not tend to cake.

I claim:

In a process for recovering a finely divided benzene hexachloride product from a benzene solution thereof by atomizing said benzene hexachloride solution with steam to effect vaporization of said benzene from said benzene hexachloride and separating the resulting benzene-steam vapor from the benzene-free benzene hexachloride particles, the improvement comprising settling said particles into a body of water, thereby immediately cooling said benzene hexachloride particles to prevent agglomeration thereof and slurrying said particles in said water, and recovering the water slurry.

References Cited in the file of this patent

UNITED STATES PATENTS

| Number | Name | Date |
|---|---|---|
| 1,318,533 | Bontet | Oct. 14, 1919 |
| 2,245,536 | Thurman | June 10, 1941 |
| 2,316,670 | Colgate et al. | Apr. 13, 1943 |
| 2,347,669 | Dennis | May 2, 1944 |

FOREIGN PATENTS

| Number | Country | Date |
|---|---|---|
| 611,234 | Great Britain | Oct. 27, 1948 |